US012619462B2

(12) United States Patent
He et al.

(10) Patent No.: US 12,619,462 B2
(45) Date of Patent: May 5, 2026

(54) TRANSACTION PERFORMANCE BY PARALLEL WAL IO AND PARALLEL WAKING UP TRANSACTION COMMIT WAITERS

(71) Applicant: Google LLC, Mountain View, CA (US)

(72) Inventors: Yingjie He, Cupertino, CA (US); Yi Ding, Mountain View, CA (US)

(73) Assignee: Google LLC, Mountain View, CA (US)

( * ) Notice: Subject to any disclaimer, the term of this patent is extended or adjusted under 35 U.S.C. 154(b) by 602 days.

(21) Appl. No.: 18/309,576

(22) Filed: Apr. 28, 2023

(65) Prior Publication Data

US 2024/0362063 A1      Oct. 31, 2024

(51) Int. Cl.
*G06F 9/48* (2006.01)
*G06F 9/46* (2006.01)

(52) U.S. Cl.
CPC ............ *G06F 9/4881* (2013.01); *G06F 9/463* (2013.01)

(58) Field of Classification Search
CPC ............................... G06F 9/4881; G06F 9/463
See application file for complete search history.

(56) References Cited

U.S. PATENT DOCUMENTS

| | | | | | |
|---|---|---|---|---|---|
| 6,173,292 | B1 * | 1/2001 | Barber | ................ | G06F 11/1471 707/999.005 |
| 7,620,661 | B2 * | 11/2009 | Mehaffy | ............. | G06F 16/2358 |
| 11,526,490 | B1 * | 12/2022 | Zhang | ................. | G06F 16/2358 |
| 2013/0117236 | A1 * | 5/2013 | Schreter | ............. | G06F 16/2306 707/682 |
| 2015/0310054 | A1 * | 10/2015 | Passey | ............... | G06F 16/2358 707/703 |
| 2025/0094411 | A1 * | 3/2025 | Ivey | .................... | G06F 16/2379 |

* cited by examiner

*Primary Examiner* — Wissam Rashid
(74) *Attorney, Agent, or Firm* — Shumaker & Sieffert, P.A.

(57) ABSTRACT

A method for performing logging of modifications of a database includes, for each backend process of a plurality of backend processes simultaneously, writing a respective log entry to a write-ahead log buffer, submitting a respective commit request requesting the respective log entry be committed to a write-ahead log, and sleeping the respective backend process. The method also includes writing, using a dedicated writing process and direct asynchronous input/ output, one or more of the respective log entries in the write-ahead log buffer to the write-ahead log. The dedicated writing process is different from each respective backend process of the plurality of backend processes. The method also includes updating a log sequence number pointer based on the respective log sequence numbers of the one or more of the respective log entries and waking, based on the log sequence number pointer, one or more of the respective backend processes.

20 Claims, 6 Drawing Sheets

500

For each backend process

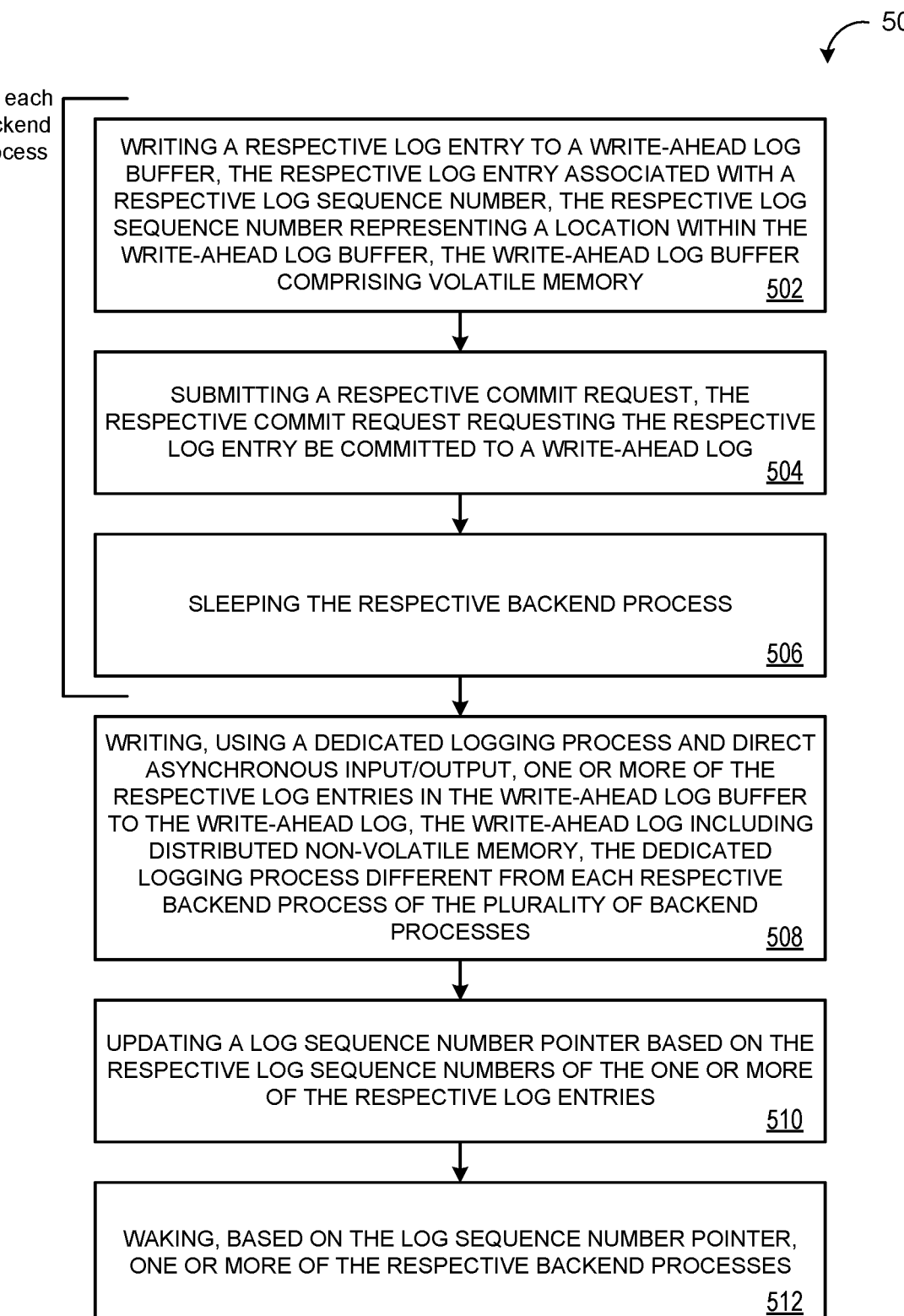

WRITING A RESPECTIVE LOG ENTRY TO A WRITE-AHEAD LOG BUFFER, THE RESPECTIVE LOG ENTRY ASSOCIATED WITH A RESPECTIVE LOG SEQUENCE NUMBER, THE RESPECTIVE LOG SEQUENCE NUMBER REPRESENTING A LOCATION WITHIN THE WRITE-AHEAD LOG BUFFER, THE WRITE-AHEAD LOG BUFFER COMPRISING VOLATILE MEMORY     502

SUBMITTING A RESPECTIVE COMMIT REQUEST, THE RESPECTIVE COMMIT REQUEST REQUESTING THE RESPECTIVE LOG ENTRY BE COMMITTED TO A WRITE-AHEAD LOG     504

SLEEPING THE RESPECTIVE BACKEND PROCESS

506

WRITING, USING A DEDICATED LOGGING PROCESS AND DIRECT ASYNCHRONOUS INPUT/OUTPUT, ONE OR MORE OF THE RESPECTIVE LOG ENTRIES IN THE WRITE-AHEAD LOG BUFFER TO THE WRITE-AHEAD LOG, THE WRITE-AHEAD LOG INCLUDING DISTRIBUTED NON-VOLATILE MEMORY, THE DEDICATED LOGGING PROCESS DIFFERENT FROM EACH RESPECTIVE BACKEND PROCESS OF THE PLURALITY OF BACKEND PROCESSES     508

UPDATING A LOG SEQUENCE NUMBER POINTER BASED ON THE RESPECTIVE LOG SEQUENCE NUMBERS OF THE ONE OR MORE OF THE RESPECTIVE LOG ENTRIES     510

WAKING, BASED ON THE LOG SEQUENCE NUMBER POINTER, ONE OR MORE OF THE RESPECTIVE BACKEND PROCESSES     512

FIG. 5

TRANSACTION PERFORMANCE BY PARALLEL WAL IO AND PARALLEL WAKING UP TRANSACTION COMMIT WAITERS

CROSS REFERENCE TO RELATED APPLICATIONS

Technical Field

This disclosure relates to transaction performance by parallel write-ahead logging (WAL) input/output (IO) and parallel waking up transaction commit waiters.

BACKGROUND

Transaction performance is critical for online transaction processing (OLTP) applications. In most database management systems (DBMS), before a transaction is committed, a write-ahead log must be flushed to disk. Conventionally, write-ahead logging (WAL) is a serialized operation, where a semaphore or mutex is used to wake transaction committers waiting for transactions to flush to the log. This leads to significant overhead costs when there are large numbers of waiters and does not fully utilize modern processors or disk capacity.

SUMMARY

One aspect of the disclosure provides a computer-implemented method for performing logging of modifications of a database. The method, when executed by data processing hardware, causes the data processing hardware to perform operations. For each respective backend process of a plurality of backend processes simultaneously, the operations include writing a respective log entry to a write-ahead log buffer. The respective log entry is associated with a respective log sequence number and the respective log sequence number represents a location within the write-ahead log buffer. The write-ahead log buffer includes volatile memory. The operations also include submitting a respective commit request requesting the respective log entry be committed to a write-ahead log and sleeping the respective backend process. The operations also include writing, using a dedicated writing process and direct asynchronous input/output, one or more of the respective log entries in the write-ahead log buffer to the write-ahead log. The write-ahead log includes distributed non-volatile memory and the dedicated writing process is different from each respective backend process of the plurality of backend processes. The operations include updating a log sequence number pointer based on the respective log sequence numbers of the one or more of the respective log entries and waking, based on the log sequence number pointer, one or more of the respective backend processes.

Implementations of the disclosure may include one or more of the following optional features. In some implementations, waking the one or more of the respective backend processes includes, for each respective backend process of the one or more of the respective backend processes, selecting, from a thread pool, a respective thread and waking, using the selected respective thread, the respective backend process.

Optionally, sleeping the respective backend process includes a futex operation. Each respective backend process may be associated with a separate futex operation. In some implementations, updating the log sequence number pointer includes determining a contiguous portion of the write-ahead log occupied by the one or more of the respective log entries.

In some examples, the write-ahead log buffer includes a plurality of blocks and each block represents a fixed amount of the write-ahead log buffer. In some of these examples, each respective block of the plurality of blocks is associated with a respective block pointer and updating the log sequence number pointer based on the respective log sequence numbers of the one or more of the respective log entries is based on the respective block pointers. The write-ahead log buffer may be associated with a block counter representing a quantity of blocks that are full. In some of these examples, updating the log sequence number pointer based on the respective log sequence numbers of the one or more of the respective log entries is further based on the block counter. Optionally, submitting the respective commit request includes queuing the respective commit request in a commit queue.

Another aspect of the disclosure provides a system for logging of modifications of a database. The system includes data processing hardware and memory hardware in communication with the data processing hardware. The memory hardware stores instructions that when executed on the data processing hardware cause the data processing hardware to perform operations. For each respective backend process of a plurality of backend processes simultaneously, the operations include writing a respective log entry to a write-ahead log buffer. The respective log entry is associated with a respective log sequence number and the respective log sequence number represents a location within the write-ahead log buffer. The write-ahead log buffer includes volatile memory. The operations also include submitting a respective commit request requesting the respective log entry be committed to a write-ahead log and sleeping the respective backend process. The operations also include writing, using a dedicated writing process and direct asynchronous input/output, one or more of the respective log entries in the write-ahead log buffer to the write-ahead log. The write-ahead log includes distributed non-volatile memory and the dedicated writing process is different from each respective backend process of the plurality of backend processes. The operations include updating a log sequence number pointer based on the respective log sequence numbers of the one or more of the respective log entries and waking, based on the log sequence number pointer, one or more of the respective backend processes.

This aspect may include one or more of the following optional features. In some implementations, waking the one or more of the respective backend processes includes, for each respective backend process of the one or more of the respective backend processes, selecting, from a thread pool, a respective thread and waking, using the selected respective thread, the respective backend process.

Optionally, sleeping the respective backend process includes a futex operation. Each respective backend process may be associated with a separate futex operation. In some implementations, updating the log sequence number pointer includes determining a contiguous portion of the write-ahead log occupied by the one or more of the respective log entries.

In some examples, the write-ahead log buffer includes a plurality of blocks and each block represents a fixed amount of the write-ahead log buffer. In some of these examples, each respective block of the plurality of blocks is associated with a respective block pointer and updating the log sequence number pointer based on the respective log sequence numbers of the one or more of the respective log entries is based on the respective block pointers. The write-ahead log buffer may be associated with a block counter representing a quantity of blocks that are full. In some of these examples, updating the log sequence number pointer based on the respective log sequence numbers of the one or more of the respective log entries is further based on the block counter. Optionally, submitting the respective commit request includes queuing the respective commit request in a commit queue.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 is a flowchart of an example arrangement of operations for a method of improving transaction performance of a database.

Like reference symbols in the various drawings indicate like elements.

DETAILED DESCRIPTION

Transaction performance is critical for online transaction processing (OLTP) applications. In most database management systems (DBMS), before a transaction is committed, a write-ahead log must be flushed to disk. Write-ahead logging (WAL) provides database systems with atomicity and durability by making use of an append-only log. Changes to the database must be recorded to the log (which is stored in non-volatile memory) prior to being written to the database. Among other advantages, the log allows the database to be reconstructed in the event of a crash or other loss of data in the database.

Conventionally (e.g., in PostgreSQL), write-ahead logging (WAL) is a serialized operation. For example, each background process writing to the database copies log entries to a shared write-ahead log buffer stored in volatile memory, and when a background process needs to write or flush a log entry to the write-ahead log stored in non-volatile memory, the process must acquire an exclusive lock (i.e., WALWriteLock). Only a single process may obtain this lock at a time and each other process must wait for the lock. Each other process will sleep while waiting for the lock and a semaphore or mutex or the like is used to wake up transaction committers which can incur significant overhead. This design is not suitable for modern multi-core processor architectures or distributed persistent disks and severely limits scaling.

Implementations herein provide a database logging system that removes contention on writing to a write-ahead log (e.g., WALWriteLock) to allow group commits in parallel. The system allows backend processes to copy WAL logs into a WAL buffer and wait for flush endpoint movement when it includes a commit transaction request. The system includes a dedicated background process (e.g., a WAL Writer Process) to write the log entries (i.e., WAL buffer data) to the WAL file during direct input/output (IO) synchronously or asynchronously. The system allows for additional IO requests to be issued without waiting for a previous IO request to finish (e.g., via asynchronous IO). Thus, the system allows for multiple IO requests to storage to improve IO throughput.

Figure 1:
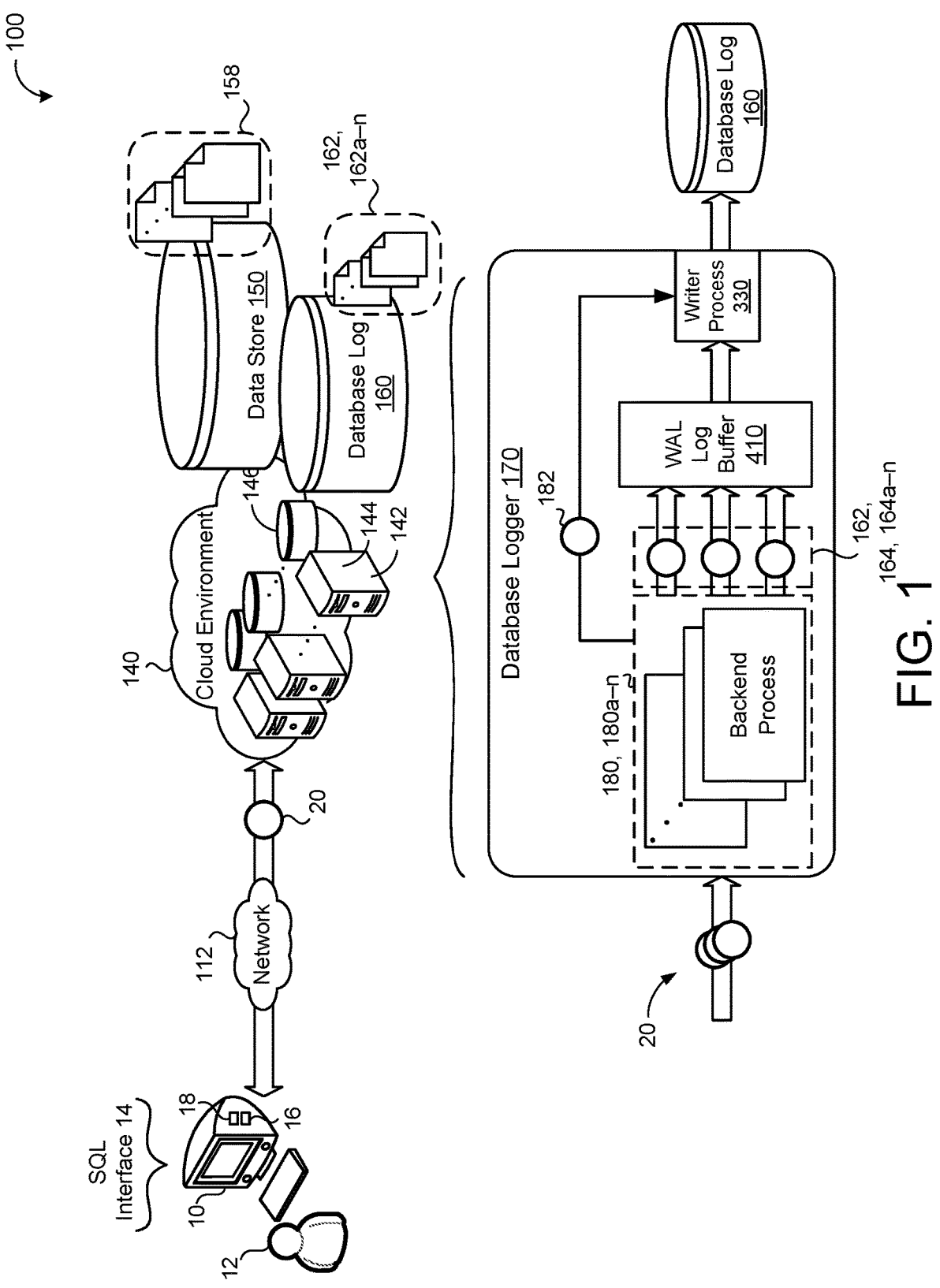
FIG. 1 is a schematic view of an example system for a database logging system.

Referring to FIG. 1, in some implementations, a database logging system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store one or more databases or tables 158, 158*a-n* (i.e., a cloud database). The data store 150 may store any number of tables 158 at any point in time.

The remote system 140 is configured to receive database queries 20 (i.e., a request 20) from user devices 10 each associated with a respective user 12 via, for example, the network 112. Each user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The users 12 may construct the database query 20 using a Structured Query Language (SQL) interface 14, although other interfaces are contemplated. The database query 20 requests the remote system 140 to query or interact with one or more of the databases 158. For example, the query 20 may request the database to conditionally return data from the database 158, add additional data to the database 158, and/or modify data in the database 158. Any number of users 12 or user devices 10 may query the database 158 concurrently or in parallel. For example, the database 158 is a distributed cloud database serving hundreds or thousands (or more) users simultaneously. Other entities may additionally or alternatively interact with the database (e.g., applications executing on the remote system 140 or on other remote servers).

The remote system 140 includes a database log 160 (i.e., a WAL log 160 or write-ahead log 160) that includes multiple log entries 162, 162*a-n*. The log entries 162 track or record all modifications to the database 158 prior to the modifications actually being applied to the database 158. The database log 160 is stored in non-volatile and persistent memory.

The remote system 140 executes a database logger 170. Prior to committing any data changes generated by the requests 20 to the database 158, the database logger 170 ensures that the changes are tracked via log entries 162 stored at the database log 160. In some examples, the database logger 170 receives, from multiple users 12 and/or applications, multiple requests 20 simultaneously and generates the log entries 162 from the requests 20. In other examples, the database logger receives the log entries 162 directly.

The database logger 170 includes multiple backend processes 180 that are each responsible for ensuring that one or more log entries are written to the database log 160 in non-volatile memory before the corresponding changes are applied to the database 158. Each respective backend process 180 writes a respective log entry 162 to a write-ahead log buffer 410 (i.e., a WAL buffer 410). The WAL buffer 410 is stored in shared volatile memory (e.g., RAM). The WAL buffer 410 may be a circular buffer or the like that each background process 180 has access to. Each log entry 162 is associated with a respective log sequence number 164 (i.e., LSN 164). In some examples, the LSN 164 indicates an address or offset or specific location within the WAL buffer 410 that the log entry 162 is stored at. For example, an LSN 164 of 1000 may indicate that the log entry 162 begins or ends at an offset of 1000 in the WAL buffer 410.

One or more of the backend processes 180 may submit a respective commit request 182 to commit one or more of the log entries 162 to the database log 160 (i.e., move or copy the log entries 162 from the volatile memory of the WAL log buffer 410 to the distributed non-volatile memory of the database log 160). As described in more detail below, after submitting the commit request 182, the backend process 180 may sleep or otherwise wait for the commit to complete.

A dedicated or independent WAL writer process 330 receives the commit request(s) 182 from the backend processes 180. The WAL writer process 330 is separate and independent from each of the background processes 180. The WAL writer process 330, in response to a commit request 182, retrieves the corresponding log entries 162 from the WAL log buffer 410 and writes or copies the log entries 162 to the database log 160. As discussed in more detail below, in addition to the log entries 162 corresponding to the commit request 182, the WAL writer process 330 also retrieves any log entries 162 prior (e.g., with a lower LSN 164) that have not already been committed. For example, when the last log entry 162 committed to the database log 160 has a LSN 164 of 1000 and the commit request 182 requests commitment of a log entry 162 with an LSN 164 of 2000, the WAL writer process 330 will write (when available), each of the log entries 162 with LSNs 164 between 1000 and 2000. That is, the WAL writer process 330, upon a commit request 182, commits all log entries 162 (without any "holes") up to the LSN 164 of the log entry 162 associated with the commit request 182.

As used herein, a hole refers to a log entry 162 that has not yet been written to the WAL buffer 410 when subsequent log entries 162 have already been written. For example, a first backend process 180 reserves space in the WAL buffer 410 between LSN 164 (0, 100] to write one or more log entries 162 and a second backend process reserves space in the WAL buffer 410 between LSN 164 (100, 200] to write one or more log entries 162. In this example, the second backend process 180 completes writing the log entries 162 to its reserved space (i.e., (100, 200]) and submits a commit request 182 to have the log entries 162 flushed to the database log 160. However, the first background process 180 has yet to complete writing the log entries 162 to its reserved space (i.e., (0, 100]). Thus, the WAL buffer has a "hole" from (0, 100] such that the log entries at the subsequent space (i.e., (100, 200]) cannot yet be committed until the hole is "filled" (i.e., writing the log entries for (0, 100] are completed). Put another way, the WAL writer process 330 cannot commit any particular log entry 162 until each log entry 162 prior to the particular log entry 162 is written to the WAL buffer 410.

Optionally, the WAL writer process 330 will commit log entries 162 up until a hole is encountered. That is, the WAL writer process 330, when committing log entries 162 to the database log 160, will commit up to and past the LSN 164 of the log entry 162 associated with the commit request 182 until the first hole is encountered. For example, when a commit request 182 requests that a log entry 162 with an LSN 164 of 100 be committed to the database log 160, and the WAL log buffer 410 is "filled" up to an LSN 164 of 200 (i.e., there are no holes between 100 and 200), the WAL writer process 330 will commit the log entries 162 up to the LSN 164 of 200, allowing for more efficient transfers to the database log 160.

In some examples, the WAL writer process 330 uses direct IO and/or asynchronous IO. Direct IO operations bypass any file system cache while asynchronous IO allows processing to continue while the IO request is submitted and processed. In contrast, when a synchronous IO request is submitted (e.g., to an operating system), the writing process is blocked until the write completes. By employing asynchronous IO, the WAL writer process 330 is free to continue to process other commit requests 182 while waiting for the write to complete. Each commit request 182 may be submitted to a commit queue or the like.

After the write to the database log 160 completes, the database logger wakes or otherwise alerts the sleeping/ waiting backend process 180 that the respective log entries 162 have been flushed to the database log 160. The backend process 180 is then free to initiate the corresponding modification to the database 158 (i.e., the modification described and recorded by the log entries 162 committed to the database log 160).

Figure 2:
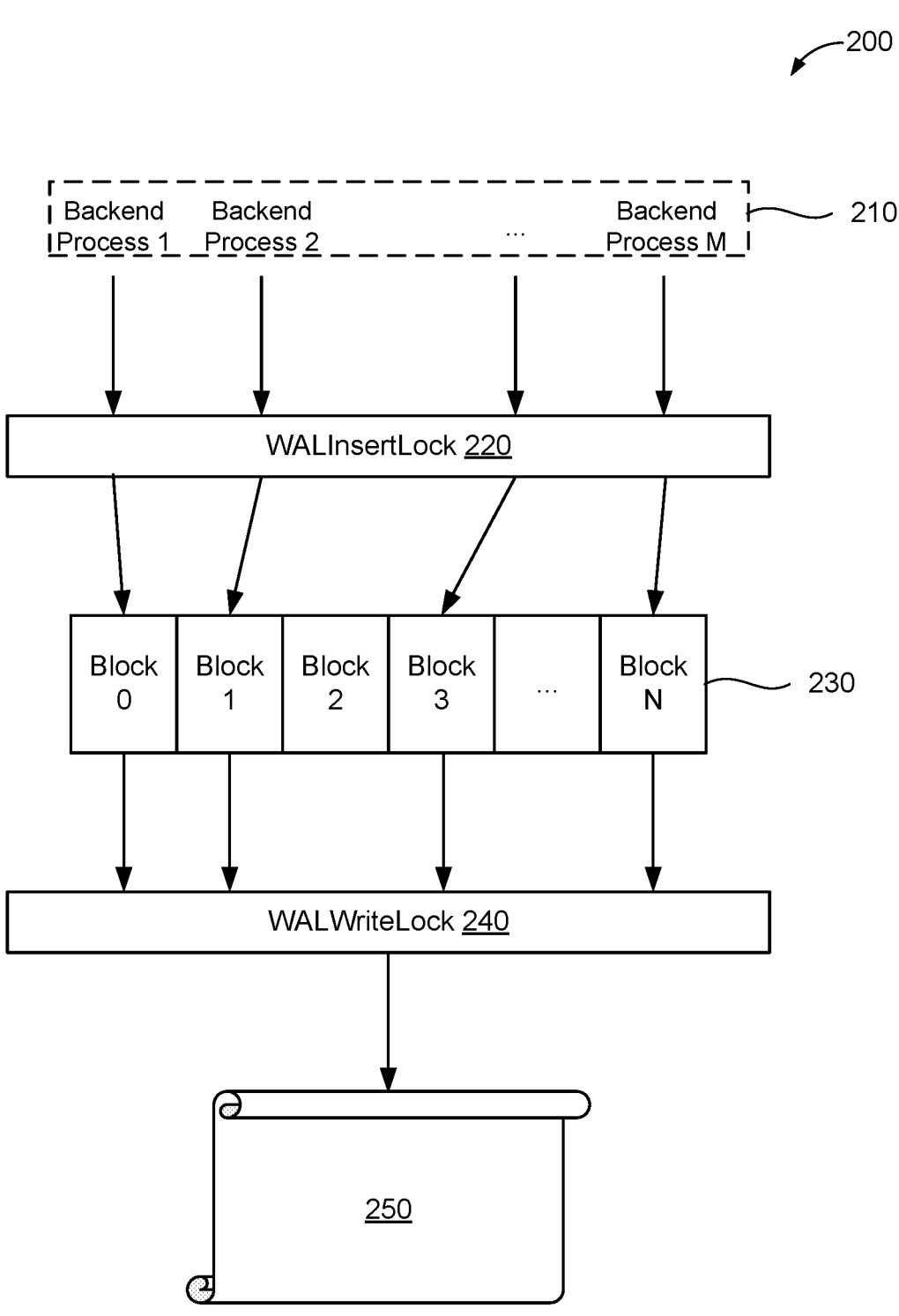
FIG. 2 is a schematic view of a conventional data logging system implementing write-ahead logging (WAL).

Referring now to FIG. 2, a schematic view 200 illustrates a conventional WAL writer (e.g., a PostgreSQL WAL writer). Here, a partitioned lock 220 (i.e., WALInsertLock) allows for concurrent writes to a buffer 230 based on the number of locks. Generally, the partitioned lock 220 defaults to eight locks, so up to eight processes 210 may write data to the buffer 230 concurrently. The locks may be assigned in a round robin fashion. However, in order to flush or commit data from the buffer 230 to the log 250, each process 210 must obtain an exclusive lock 240 (i.e., a WALWriteLock). Thus, flushing data to the log 250 is a serialized operation and in practice, is a significant bottleneck for large databases (e.g., cloud databases).

Figure 3:
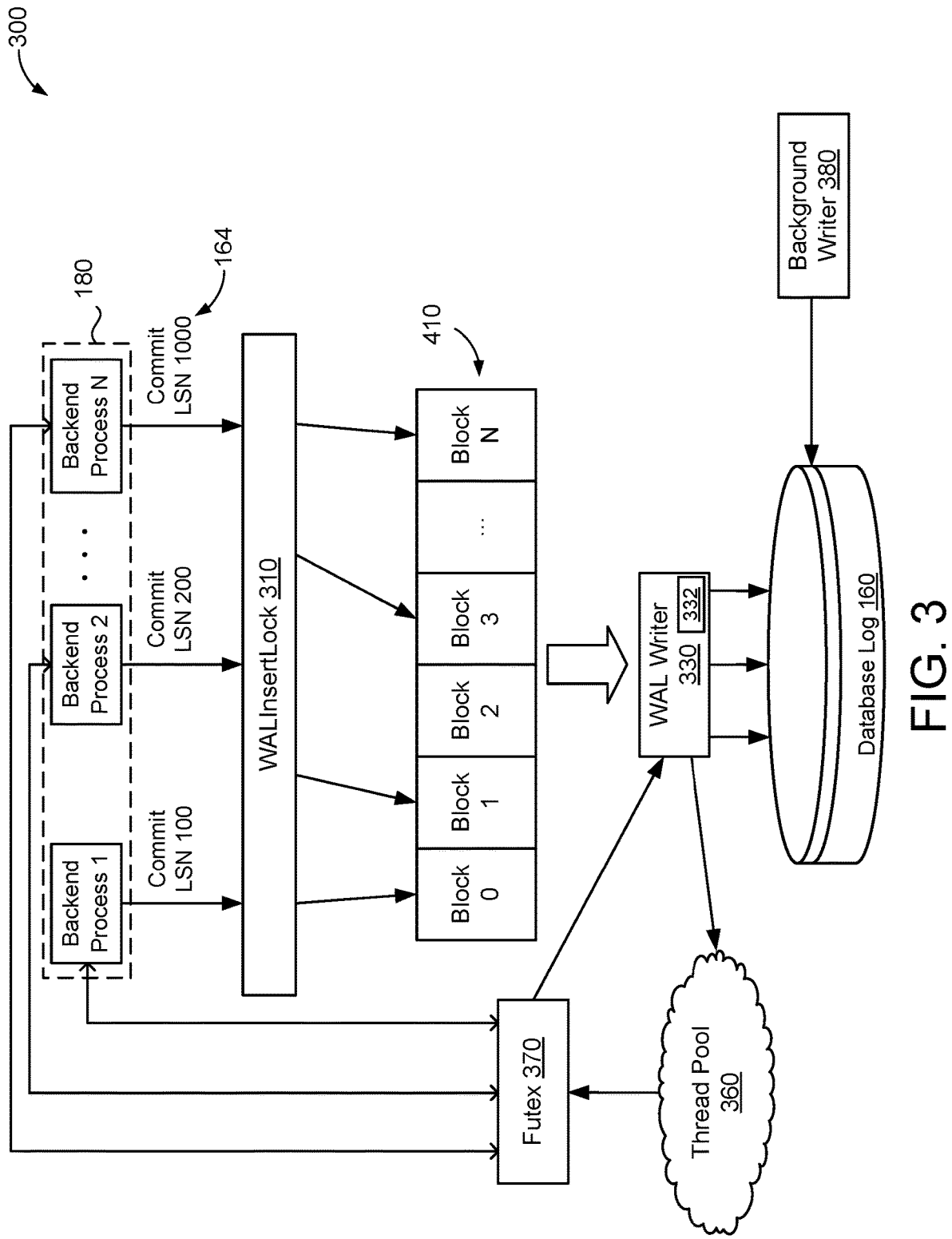
FIG. 3 is a schematic view of exemplary components of the database logging system of claim 1.

Referring now to FIG. 3, in contrast to the conventional technique of FIG. 2, the database logging system 100 includes the dedicated WAL writer process 330 that is the exclusive process that writes to the database log 160. All other processes (i.e., the backend processes 180) write only to the WAL buffer 410. The WAL writer process 330 avoids the competition necessary in accessing an exclusive lock 240 (i.e., the WALWriteLock 240). Moreover, because the database log 160 is stored on distributed persistent disks (e.g., multiple separate high-speed data disks, such as solid-state drives), the WAL writer process 330 may write multiple log entries 162 to the database log 160 concurrently (e.g., different log entries 162 to different disks that cooperate to store the database log 160).

In some examples, the WAL writer process 330, after writing one or more entries to the database log 160, updates a LSN pointer 332 based on the LSNs 164 of the log entries 162 written to the database log 160. The WAL writer process 330 wakes respective backing processes based on the LSN pointer 332. For example, if a background process 180 submits a commit request 182 for log entries 162 associated with an LSN 164 of 1000, this indicates that the background process 180 is to sleep/wait until log entries 162 associated with the LSN 164 of 1000 (i.e., stored at a location with the WAL buffer 410 associated with the LSN 164 of 1000) are written to the database log 160. The WAL writer process 330 may determine, based on writing a log entry 162 to the database log 160 that was associated with an LSN 164 of 1000, that the background process 180 may be woken or alerted. The WAL writer process 330 may track the LSN 164 of the most recent log entry 162 written to the database log 160 using the LSN pointer 332.

In some implementations, the background processes 180 sleep or are blocked using a futex operation (i.e., a fast userspace mutex operation). A futex operation is a kernel system call that may be used to implement locking. Generally speaking, a futex operation allows a process to wait or sleep until a certain condition becomes true. In some examples, the back processes 180 may each set up a separate futex 370 that instructs the process 180 to be awoken or alerted when a log entry 162 associated with a respective LSN 164 is written to the database log 160. For example, when a background process 180 submits a commit request 182 for log entries 162 associated with an LSN 164 of 1000, the backend process 180 may set up a futex 370 associated with a value of 1000. The WAL writer process 330 may compare the LSN pointer 332 with the futex 370 to determine (e.g., by reading the futex 370) whether the respective backend process 180 is to be alerted/awoken.

In some of these implementations, the system 100 includes a thread pool 360. The WAL writer process 330, upon determining that one or more backend processes 180 are to be alerted that their respective log entries 162 are committed to the database log 160, selects a thread from the thread pool 360 to alert each respective backend process 180. Each selected thread then wakes the respective backend process 180. Each thread may wake a single backend process 180. In some implementations, a thread may wake multiple backend processes 180. The mapping of threads to backend processes 180 may be based on performance requirements of the system and the number of threads available. In this manner, the WAL writer process 330 may wake multiple backend processes 180 simultaneously. For example, when a first backend process 180 is waiting on a commit associated with an LSN 164 of 100, a second background process 180 is waiting on a commit associated with an LSN 164 of 200, and a third background process 180 is waiting on a commit associated with an LSN 164 of 300, the WAL writer process 330, after updating the LSN pointer 332 to 300, may determine that all three backend processes 180 are to be alerted (as the WAL writer process 330 committed log entries 162 associated with all three backend processes 180). In this example, the WAL writer process 330 may select three separate threads from the thread pool 360, which each thread configured to wake/alert one of the respective backend processes 180 simultaneously.

In some implementations, the database log 160 is divided into equal-sized segments (e.g., 16 megabytes). As a segment of the database log 160 is filled, the WAL writer process 330 begins writing to the next segment. Optionally, a background writer process 380 preallocates or otherwise prepares (e.g., writes all zeroes or writes all ones or otherwise erases or clears) the next segment for the WAL writer process 330 while the WAL writer process 330 is still writing to the previous segment. Thus, instead of halting writes while preparing the next segment, the WAL writer process 330 may seamlessly transition to the next segment that has already been prepared by the background writer process 380.

Figure 4:
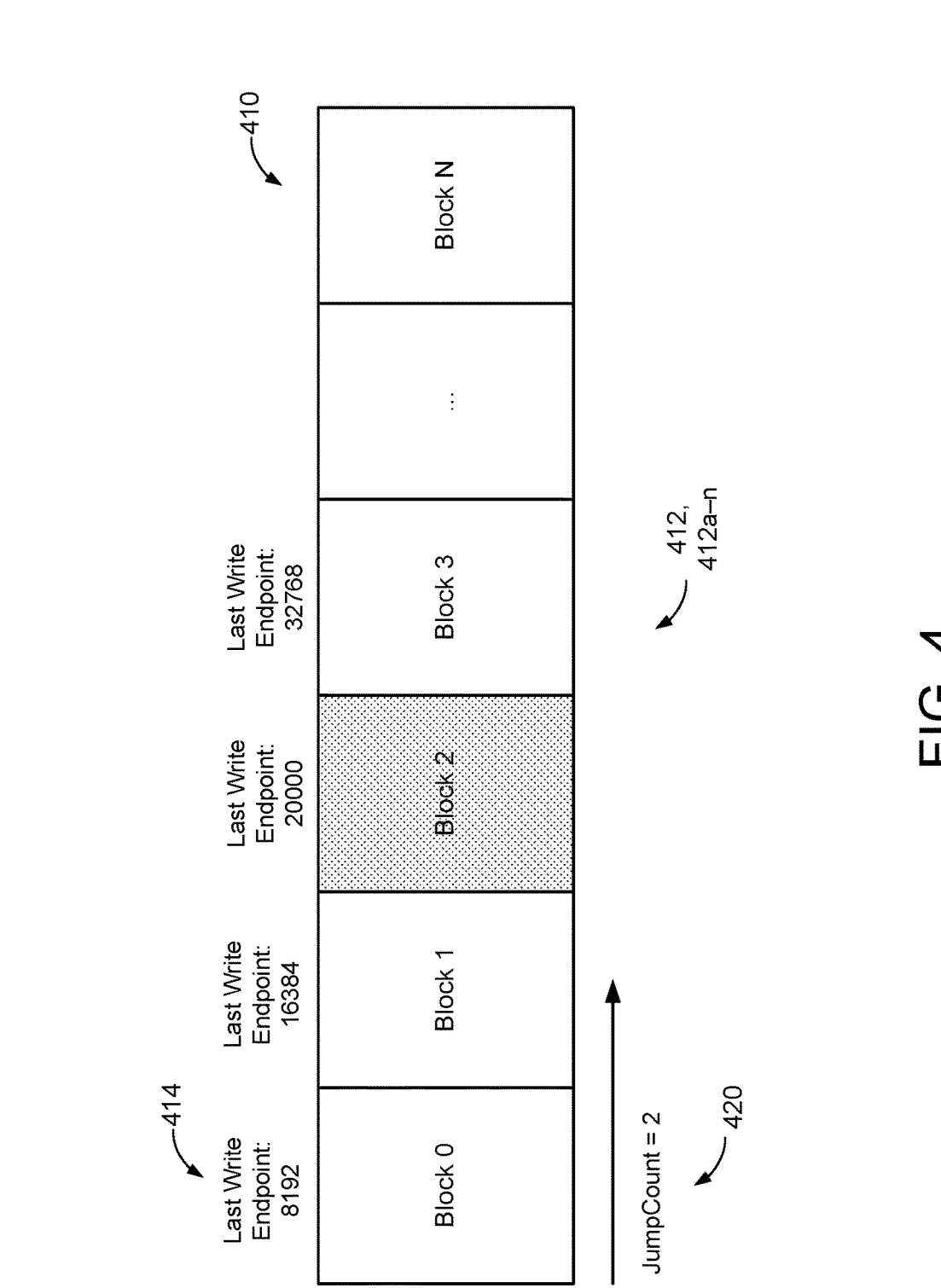
FIG. 4 is a schematic view of a WAL buffer.

Referring now to FIG. 4, a schematic view 400 includes an exemplary WAL buffer 410. The WAL writer process 330 (FIG. 3), when writing to the database log 160, must ensure that there are no holes in the WAL buffer 410. That is, the WAL writer process 330 will not commit any particular log entry 162 until each log entry 162 prior to the particular log entry 162 (based on the LSN 164) is written to the WAL buffer 410. For example, when attempting to commit a log entry 162 with an LSN 164 of 1000, the WAL writer process 330 ensures that each log entry 162 with an LSN 164 between the LSN 164 of the last written log entry 162 (i.e., the current LSN pointer 332) and the LSN 164 of 1000 has been written to the WAL buffer 410 prior to committing the log entry 162 at LSN 164 of 1000.

Accordingly, in some implementations, the WAL writer process 330, when receiving commit requests 182, determines that the WAL buffer 410 is contiguous from the current LSN pointer 332 (i.e., from the last log entry 162 written) to the LSN 164 to be committed per the commit request 182. For example, when the current LSN pointer 332 is at 1000 and a commit request 182 requests a commit of LSN 164 of 2000, the WAL writer process 330 determines whether the WAL buffer 410 is complete (i.e., has no holes) between LSNs 164 of 1000 and 2000. When one or more holes are present, the WAL writer process 330 may delay the commit until the holes are filled. The WAL writer process 330, in some examples, updates the LSN pointer 332 based on contiguous portion of log entries 162 from the WAL buffer 410. In the above example, once there are no holes between the LSNs 164 of 1000 to 2000, the WAL writer process 330 may commit the corresponding log entries 162 and subsequently update the LSN pointer 332 to 2000.

As shown in FIG. 4, in some implementations, the WAL buffer 410 includes multiple blocks 412, 412a-n. Each block 412 represents a fixed amount of the WAL buffer 410. The blocks 412 may be any appropriate size. For example, each block 412 is 8192 bytes in size. The background processes 180 may each write log entries 162 to different blocks 412 within the WAL buffer 410 and accordingly each block 412 may "fill" (i.e., have log entries 162 written to the available space within the block 412) at different rates. In order track a completed write/flush endpoint (and thus avoid having to scan each block 412), in some implementations, each block 412 is associated with a respective block pointer 414. The block pointer 414 points to the last write endpoint for the respective block 412. The block pointers 414 may be stored in a block status array. The WAL writer process 330 may determine that a particular block 412 of the WAL buffer 410 is full (i.e., each available location has a log entry 162) based on the block pointer 414. For example, each block 412 includes an end block pointer 418 associated with the end of the block 412. When the block pointer 414 matches the end block pointer 418, the corresponding block 412 is full. The end block pointer 414 may be determined based on the size of each block 412 and the continuous LSN 164. When a block 412 is not full (i.e., the block pointer 414 is not equal to the end block pointer 418), writing any log entries 162 beyond the non-full block will result in a hole.

After a write to the database log 160 completes, the WAL writer process 330 may scan the WAL buffer block status array from the current write endpoint to track the completed write endpoint. A jump count 420 (i.e., a block counter 420) may represent a number of complete (i.e., full) blocks 412 that the WAL writer process 330 may skip while scanning for holes. In the example of FIG. 4, each block has a size of 8192 (e.g., 8192 bytes). Here, Block 0 has a block pointer 414 of 8192 while Block 1 has a block pointer 414 of 16384, indicating that both of these blocks 412 are full. Block 3 has a block pointer 414 of 32768, also indicating that the block 412 is full. However, Block 2 has a block pointer 414 of 20000, indicating that the block 412 is not yet full and represents a hole. The jump count 420 in this example is 2, indicating that the WAL writer process 330 may skip the first two blocks 412 (i.e., Block 0 and Block 1) as they are full. The WAL writer process 330 may update the LSN pointer 332 based on the respective block pointers 414.

FIG. 5 is a flowchart of an exemplary arrangement of operations for a method 500 of logging modifications to a database. For each respective backend process 180 of a plurality of backend processes 180 simultaneously, the method 500, at operation 502, includes writing a respective log entry 162 to a WAL buffer 410. The respective log entry 162 is associated with a respective LSN 164. The respective LSN 164 represents a location within the WAL buffer 410 and the WAL buffer 410 includes shared volatile memory. At operation 504, the method 500 includes submitting a respective commit request 182. The respective commit request 182 requests the respective log entry 162 be committed to a database log 160 (i.e., a write-ahead log 160). At operation 506, the method 500 includes sleeping the respective backend process 180.

At operation 508, the method 500 includes writing, using a dedicated writing process 330 (i.e., the WAL writer process 330) and direct asynchronous input/output, one or more of the respective log entries 162 in the WAL buffer 410 to the database log 160. The database log 160 includes distributed non-volatile memory. The dedicated writing process 330 is different from each respective backend process 180 of the plurality of backend processes 180. At operation 510, the method 500 includes updating a LSN pointer 332 based on the respective LSNs 164 of the one or more of the respective log entries 162. The method 500, at operation 512, includes waking, based on the LSN pointer 332, one or more of the respective backend processes 180.

Figure 6:
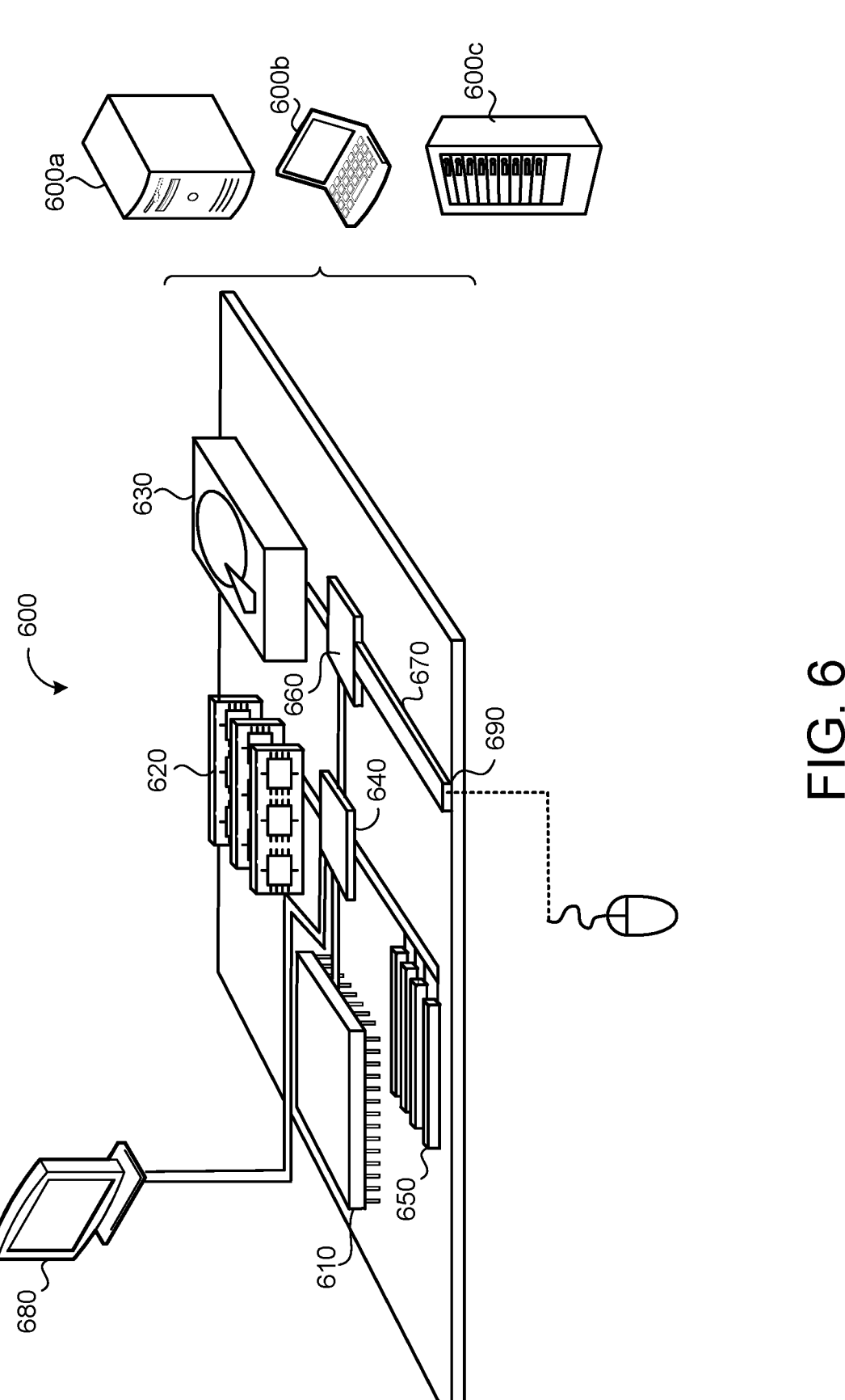
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   for each respective backend process of a plurality of backend processes simultaneously:
      writing a respective log entry to a write-ahead log buffer, the respective log entry associated with a respective log sequence number, the respective log sequence number representing a location within the write-ahead log buffer, the write-ahead log buffer comprising volatile memory;
      submitting a respective commit request, the respective commit request requesting the respective log entry be committed to a write-ahead log; and
      sleeping the respective backend process;
   writing, using a dedicated writing process and direct asynchronous input/output, one or more of the respective log entries in the write-ahead log buffer to the write-ahead log, the write-ahead log comprising distributed non-volatile memory, the dedicated writing process different from each respective backend process of the plurality of backend processes;
   updating a log sequence number pointer based on the respective log sequence numbers of the one or more of the respective log entries; and
   waking, based on the log sequence number pointer, one or more of the respective backend processes.

2. The method of claim 1, wherein waking the one or more of the respective backend processes comprises, for each respective backend process of the one or more of the respective backend processes:
   selecting, from a thread pool, a respective thread; and
   waking, using the selected respective thread, the respective backend process.

3. The method of claim 1, wherein sleeping the respective backend process comprises a futex operation.

4. The method of claim 3, wherein each respective backend process is associated with a separate futex operation.

5. The method of claim 1, wherein updating the log sequence number pointer comprises determining a contiguous portion of the write-ahead log occupied by the one or more of the respective log entries.

6. The method of claim 1, wherein the write-ahead log buffer comprises a plurality of blocks, each block representing a fixed amount of the write-ahead log buffer.

7. The method of claim 6, wherein:
   each respective block of the plurality of blocks is associated with a respective block pointer; and
   updating the log sequence number pointer based on the respective log sequence numbers of the one or more of the respective log entries is based on the respective block pointers.

8. The method of claim 7, wherein the write-ahead log buffer is associated with a block counter representing a quantity of blocks that are full.

9. The method of claim 8, wherein updating the log sequence number pointer based on the respective log sequence numbers of the one or more of the respective log entries is further based on the block counter.

10. The method of claim 1, where submitting the respective commit request comprises queuing the respective commit request in a commit queue.

11. A system comprising:

data processing hardware; and memory hardware in communication with the data processing hardware, the memory hardware storing instructions that when executed on the data processing hardware cause the data processing hardware to perform operations comprising:

for each respective backend process of a plurality of backend processes simultaneously:

writing a respective log entry to a write-ahead log buffer, the respective log entry associated with a respective log sequence number, the respective log sequence number representing a location within the write-ahead log buffer, the write-ahead log buffer comprising volatile memory;

submitting a respective commit request, the respective commit request requesting the respective log entry be committed to a write-ahead log; and sleeping the respective backend process;

writing, using a dedicated writing process and direct asynchronous input/output, one or more of the respective log entries in the write-ahead log buffer to the write-ahead log, the write-ahead log comprising distributed non-volatile memory, the dedicated writing process different from each respective backend process of the plurality of backend processes;

updating a log sequence number pointer based on the respective log sequence numbers of the one or more of the respective log entries; and waking, based on the log sequence number pointer, one or more of the respective backend processes.

12. The system of claim 11, wherein waking the one or more of the respective backend processes comprises, for each respective backend process of the one or more of the respective backend processes:

selecting, from a thread pool, a respective thread; and waking, using the selected respective thread, the respective backend process.

13. The system of claim 11, wherein sleeping the respective backend process comprises a futex operation.

14. The system of claim 13, wherein each respective backend process is associated with a separate futex operation.

15. The system of claim 11, wherein updating the log sequence number pointer comprises determining a contiguous portion of the write-ahead log occupied by the one or more of the respective log entries.

16. The system of claim 11, wherein the write-ahead log buffer comprises a plurality of blocks, each block representing a fixed amount of the write-ahead log buffer.

17. The system of claim 16, wherein:

each respective block of the plurality of blocks is associated with a respective block pointer; and updating the log sequence number pointer based on the respective log sequence numbers of the one or more of the respective log entries is based on the respective block pointers.

18. The system of claim 17, wherein the write-ahead log buffer is associated with a block counter representing a quantity of blocks that are full.

19. The system of claim 18, wherein updating the log sequence number pointer based on the respective log sequence numbers of the one or more of the respective log entries is further based on the block counter.

20. The system of claim 11, where submitting the respective commit request comprises queuing the respective commit request in a commit queue.

* * * * *